US009268972B2

(12) United States Patent
Prakash et al.

(10) Patent No.: US 9,268,972 B2
(45) Date of Patent: Feb. 23, 2016

(54) TAMPER DETECTOR POWER SUPPLY WITH WAKE-UP

(71) Applicants: Siddi Jai Prakash, New Delhi (IN); Kumar Abhishek, Ghaziabad (IN); Prashant Bhargava, Gurgaon (IN); Michael A. Stockinger, Austin, TX (US)

(72) Inventors: Siddi Jai Prakash, New Delhi (IN); Kumar Abhishek, Ghaziabad (IN); Prashant Bhargava, Gurgaon (IN); Michael A. Stockinger, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 213 days.

(21) Appl. No.: 14/246,132

(22) Filed: Apr. 6, 2014

(65) Prior Publication Data
US 2015/0286846 A1 Oct. 8, 2015

(51) Int. Cl.
*G08B 21/00* (2006.01)
*G06F 21/86* (2013.01)
*H04Q 9/14* (2006.01)
*G01D 4/00* (2006.01)
*G01R 22/06* (2006.01)

(52) U.S. Cl.
CPC ............... *G06F 21/86* (2013.01); *G01D 4/004* (2013.01); *G01R 22/066* (2013.01); *H04Q 9/14* (2013.01)

(58) Field of Classification Search
CPC ......... G06F 21/86; G06F 21/26; G06F 21/10; G06F 21/72; G01D 4/002; G01D 4/004; G01R 22/066; G01R 22/063; H04Q 9/14; H04Q 9/00; G08B 21/18; G08B 3/10; G08B 21/12; G08B 25/14; G08B 21/185; Y02B 90/242; Y04S 20/322
USPC .......... 340/540, 870.02, 870.01, 870.03, 635, 340/637; 324/110, 142; 713/194, 320, 502; 726/34
See application file for complete search history.

(56) References Cited

U.S. PATENT DOCUMENTS

| 5,383,143 | A | 1/1995 | Crouch et al. |
| 5,446,864 | A | 8/1995 | Burghardt |
| 5,457,748 | A | 10/1995 | Bergum |
| 5,473,322 | A * | 12/1995 | Carney ................. G01R 22/066 324/110 |
| 6,002,501 | A | 12/1999 | Smith |
| 6,646,565 | B1 | 11/2003 | Fu |
| 6,757,352 | B1 | 6/2004 | Kao |
| 6,946,960 | B2 | 9/2005 | Sisson |
| 7,287,169 | B2 * | 10/2007 | Youssef ............... G01R 22/066 711/109 |

(Continued)

OTHER PUBLICATIONS

Xavier Charvet and Herve Pelletier, "Improving the DPA attack using Wavelet transform", http://csrc.nist.gov/groups/STM/cmvp/documents/fips140-3/physec/physecdoc.html, undated (downloaded Mar. 5, 2012).

(Continued)

*Primary Examiner* — Anh V La
(74) *Attorney, Agent, or Firm* — Charles E. Bergere

(57) ABSTRACT

A tamper detector has tamper detection logic connected to tamper detection ports through a tamper detection interface. A real-time clock (RTC) provides a clock signal and has a battery. A processor is powered by an external power supply in a powered operational mode and has a power-off mode. In a wake-up configuration, a wake-up signal on a specific I/O port awakens the external power supply from the power-off mode to supply power to the RTC and the tamper detection interface when power from the battery is unavailable. The tamper detection ports continue to function despite removal or discharge of the battery without ESD concerns. The specific I/O port optionally may be configured for passive tamper detection.

17 Claims, 2 Drawing Sheets

(56) References Cited

U.S. PATENT DOCUMENTS

| | | |
|---|---|---|
| 7,409,557 B2 | 8/2008 | Keppler |
| 7,733,117 B1 | 6/2010 | Priel |
| 7,952,401 B2 | 5/2011 | Ramakrishnan |
| 7,953,989 B1 | 5/2011 | Hsiang |
| 8,171,336 B2 | 5/2012 | Priel |
| 8,245,068 B2 | 8/2012 | Priel |
| 8,327,448 B2 | 12/2012 | Eldar |
| 8,443,224 B2 | 5/2013 | Bhargava |
| 8,754,634 B2 * | 6/2014 | Chamarti ............ G01R 22/066 200/61.93 |
| 2004/0128528 A1 | 7/2004 | Poisner |
| 2009/0293132 A1 | 11/2009 | Henry |
| 2010/0192014 A1 | 7/2010 | Mejdrich |
| 2013/0312122 A1 | 11/2013 | Arora et al. |
| 2014/0351615 A1 * | 11/2014 | Gupta ................ H03K 19/0016 713/322 |

OTHER PUBLICATIONS

Maxim, "Secure supervisor IC has active tamper detection", EE Times, Feb. 5, 2009.

R. V. Ballou, O. Franco, and R. J. Picon, "Automatic Battery Switching and Monitoring Subsystem for Power Supplies", IP.com Prior Art Database Technical Disclosure, Sep. 1, 1990, IP.com No. IPCOM000101913D.

Mohit Arora, Prashant Bhargava, and Stephen Pickering; "Anti tamper real time clock (RTC)—make your embedded system secure", EETimes, Sep. 10, 2009.

* cited by examiner

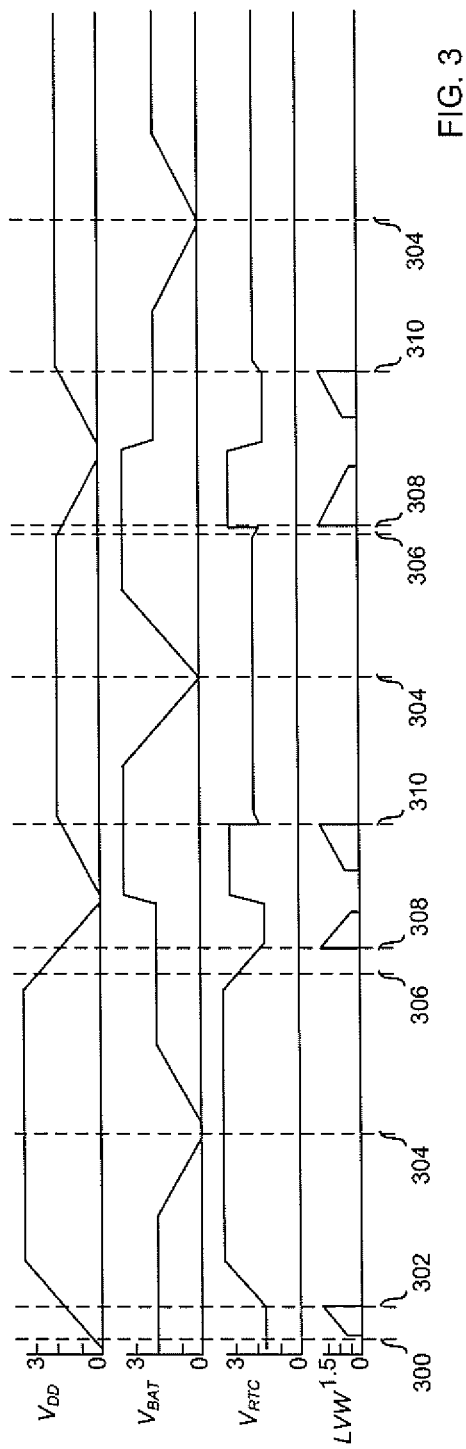

TAMPER DETECTOR POWER SUPPLY WITH WAKE-UP

BACKGROUND OF THE INVENTION

The present invention is directed to a tamper detector such as for a utility meter and, more particularly, to a wake-up capability of a power supply of a tamper detector.

Tampering with a module such as a utility meter involves unauthorized access to the module with the intention of for example, retrieving, altering or adulterating sensitive information processed by the module. A protected object may be a secured electronic module such as a utility meter, point-of-sale (POS) terminal, terminal for use with smart cards or a cryptographic module. Security and protection counter-measures against tampering typically involve detection of attack on features making unauthorized physical access more difficult, and detection of electronic intrusion.

The tamper detector may detect interference with detection circuits securing access to the module. The detection circuits may be electrical conductors whose continuity is interrupted by tampering. Alternatively, the electrical detection circuits may have switches designed to open or close if a closure is opened, or sensors detecting acceleration or other abnormal physical changes. A passive tamper detector may apply a voltage to a detection circuit of the physical security feature and detect the current in the circuit. An active tamper detector may apply a signed detection signal to one end of the detection circuit and compare it with a signal received at the other end of the detection circuit.

Tamper detectors commonly include a real-time clock (RTC) module having an RTC oscillator that provides an RTC signal that may also be used in the protected module itself. RTC modules typically have a secondary source of power in the form of a rechargeable battery so they can continue to keep time while the primary source of power is off or unavailable. This enables the rest of the system to shut down or sleep, saving power, and also enables the RTC oscillator to function if power to the system is cut off. The RTC oscillator may provide a reference clock correcting the time registered by the system clocks.

It is desirable to reduce the vulnerability of the tamper detector to attack on the RTC module itself, for example its vulnerability to attempts to disable or deteriorate the tamper detection by removing the rechargeable battery. This might be motivated in the example of an electricity meter in order to falsify usage recorded by the meter.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

FIG. 3 is a graph against time of signals appearing in operation of the tamper detector of FIGS. 1 and 2.

DETAILED DESCRIPTION

Figure 1:
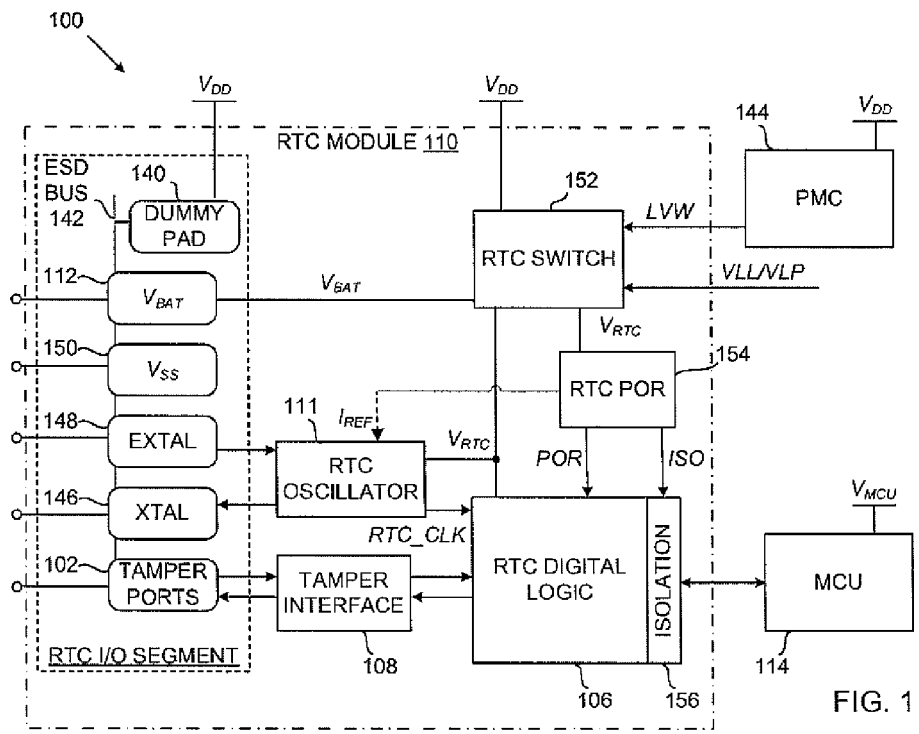
FIG. 1 is a schematic block diagram of a tamper detector in accordance with an embodiment of the present invention.
Figure 2:
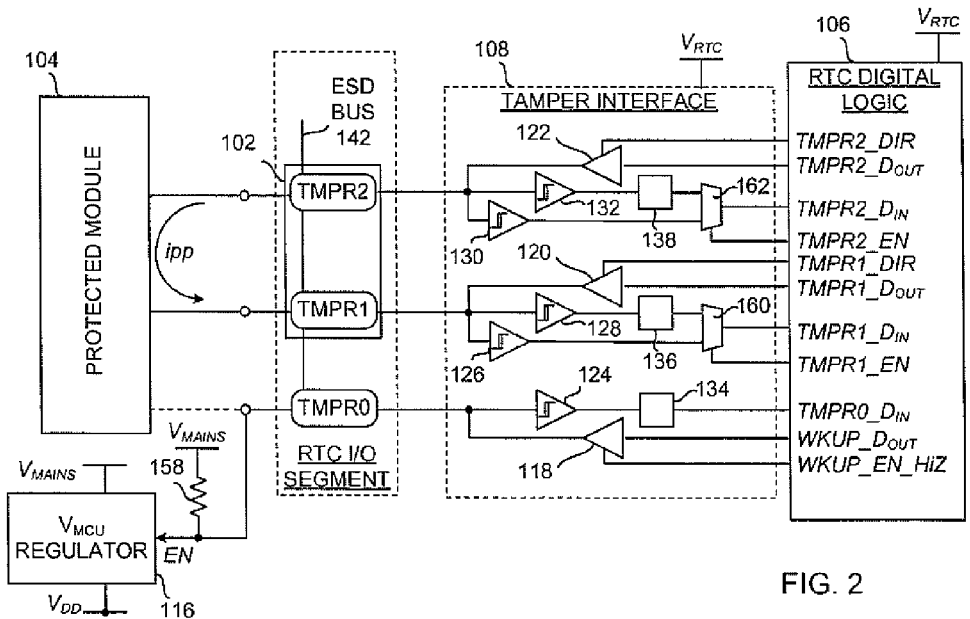
FIG. 2 is a more detailed schematic block diagram of part of the tamper detector of FIG. 1 connected with a protected module and with an external power supply, in a wake-up configuration.

Referring to FIGS. 1 and 2, a tamper detector 100 in accordance with an embodiment of the present invention is shown.

The tamper detector 100 comprises a processor 114 having a powered operational mode and a power-off mode, an external power supply 116 for supplying power ($V_{DD}$, $V_{MCU}$) to the processor 114 in the powered operational mode, and a real-time clock (RTC) module 110. The RTC module 110 includes a plurality of tamper detection ports 102 for connection to tamper detection elements (not shown) protecting a module 104. Tamper detection logic 106 is connected to the tamper detection ports 102 by way of a tamper detection interface 108. The RTC module 110 also includes an RTC oscillator 111 that provides a clock signal RTC_CLK, and may also include a power-on reset (POR) unit 154 and isolation cells 156 (described below).

A specific input/output (I/O) port TMPR0 in the RTC module 110 can be connected in a wake-up configuration to a control input of the external power supply 116, as shown in FIG. 2. The RTC module 110 is powered from the external power supply 116 in the powered operational mode and from a rechargeable battery by way of a pad ($V_{BAT}$) 112 in the power off mode. A wake-up signal EN on a specific I/O port TMPR0 in the wake-up configuration wakes up the external power supply 116 from the power off mode so that it can supply power to the RTC module 110. The external power supply 116 can then supply power to the parts of the tamper detector 100 that need to be operational in this mode, such as to the tamper detection logic 106, the tamper detection interface 108, the RTC oscillator 111, the POR unit 154, and the processor 114.

The tamper detector 100 detects tampering when it is powered either by the external power supply 116 or by the battery 112, whichever is available. The tamper detector 100 is powered by the external power supply 116, when available, and is powered by the battery 112 when the external power supply 116 is unavailable (i.e., until the external power supply is awakened). The battery 112 powers the RTC module 110, including the tamper detection logic 106 and the tamper detection interface 108 when the external power supply 116 is unavailable, for example when the system is shut down or in a low-power sleep mode. In a preferred embodiment, the battery 112 is rechargeable and is recharged by the external power supply 116.

The RTC module 110 may provide the wake-up signal EN to wake up the external power supply 116 in an isolated event and in a periodic timed sequence. The tamper detector 100 also avoids vulnerability to lack of power from the battery 112, for example due to the battery being discharged or due to attempts to disable tamper detection by removing the battery 112, by switching to power from the external power supply 116, when it is available. Another example of an isolated event when the wake-up signal is provided is when a low voltage warning (LVW) signal indicates a reduced voltage supply.

The tamper detection logic 106 is connected with the specific I/O port TMPR0 through a buffer 118 that assumes a high impedance output state to assert the wake-up signal EN, and assumes a low impedance output state to de-assert the wake-up signal EN when power from the battery 112 is available. In the wake-up configuration of the specific I/O port, a source of power $V_{MAINS}$ for the external power supply 116 may be connected to assert the wake-up signal EN for the external power supply 116 in the high impedance output state of the buffer 118, and even when the buffer 118 is not powered (if the battery 112 is removed, for example). In this example, the buffer 118 drives the specific tamper detection port TMPR0 to de-assert the wake-up signal EN in the low impedance output state.

The specific I/O port TMPR0 may also have a tamper detection configuration. In the tamper detection configuration, the specific I/O port TMPR0 is connectable, as indicated by a dashed line in FIG. 2, between a tamper detection element protecting the protected module 104 and the tamper detection logic 106. In the tamper detection configuration, the specific I/O port TMPR0 is disconnected from the source of power $V_{MAINS}$ and from the external power supply 116. The buffer 118 assumes the high impedance output state in the tamper detection configuration in response to a control signal WKUP-EN_HiZ to the buffer 118 from the tamper detection logic and enables passive tamper detection through the specific I/O port TMPR0 by enabling the tamper signal input path (trigger 124 and level shifter 134, described below). The wake-up configuration and tamper detection configuration can therefore be an option controlled through software.

The specific I/O port TMPR0 may be connectable in the tamper detection configuration to provide a passive tamper detection signal TMPR0_$D_{IN}$ from the tamper detection elements to the tamper detection logic 106 when power from either or both of the external power supply 116 and the battery 112 is available.

From the tamper detection configuration, the specific I/O port TMPR0 may be used to wake-up the external power supply 116 by de-asserting the control signal WKUP-EN_HiZ and asserting an input signal WKUP_$D_{OUT}$ the tamper detection logic 106 may provide to the buffer 118, deactivating the passive tamper detection of the specific I/O port TMPR0.

The tamper detection logic 106 can function to detect tampering, at least through the tamper detection ports TMPR1 and TMPR2, even when the battery 112 is unavailable.

The tamper detection interface 108 is configurable to connect at least two ports TMPR1 and TMPR2 for the tamper detection logic 106 to propagate an active tamper signature signal TMPR1_$D_{OUT}$, TMPR2_$D_{OUT}$ in the tamper detection elements and receive a corresponding active tamper detection signal TMPR1_$D_{IN}$, TMPR2_$D_{IN}$. In this example, the tamper detection logic 106 controls buffers 120 and 122 to control the direction of propagation of the signature signal TMPR1_$D_{OUT}$, TMPR2_$D_{OUT}$ and reception of the active tamper detection signal TMPR1_$D_{IN}$, TMPR2_$D_{IN}$ through the at least two ports TMPR1 and TMPR2. The tamper detection interface 108 may be configurable alternatively to connect the at least two ports TMPR1 and TMPR2 to provide a passive tamper detection signal from the tamper detection elements in the protected module 104 through the tamper detection ports TMPR1 and TMPR2 to the tamper detection logic 106.

In this example, the tamper detection interface 108 includes triggers 124 to 132 through which the tamper detection ports TMPR0 to TMPR2 connect to the tamper detection logic 106. The triggers 124 to 132 have predetermined output signal levels as a function of a variable input signal level. In this way, the level of analog signals received on the tamper detection ports TMPR0 to TMPR2 can be stabilized to levels suitable for inputs to the digital circuits of the tamper detection logic 106 and susceptibility to glitches is reduced without using full digital I/O drivers for the ports TMPR0 to TMPR2. The triggers 124 to 132 may be Schmitt triggers, which are comparator circuits with hysteresis.

In this example, the tamper detection interface 108 includes level shifters 134 to 138, through which the tamper detection ports TMPR0 to TMPR2 connect to the tamper detection logic 106 when the tamper detection ports TMPR0 to TMPR2 are powered by the battery 112. In this way, during passive tamper detection, the tamper detection signals reaching the tamper detection logic 106 can be derived from the voltage $V_{RTC}$, with detection protected from battery voltage variation, even if the tamper detection signals originate from the battery voltage.

A dummy pad 140 may be connected to receive power from the external power supply $V_{DD}$ and to power an electrostatic discharge (ESD) bus 142 connected to the tamper detection ports and the specific I/O port when power from the battery 112 is unavailable. The further port 140 may be a dummy port, not used for signals, connected internally and not connected to an external pin. The dummy pad 140 keeps the ESD bus 142 powered when power from the battery 112 is unavailable. This ensures that when tamper ports are active without the battery 112, the ESD network is silent and does not trigger. If the dummy pad 140 was not provided, then when the battery 112 was unavailable as soon as tamper signals become active, any transition on the tamper ports would be seen as an ESD event because the voltage $V_{BAT}$ of the battery 112 is OFF ($V_{BAT}$ being also the power supply for the I/O pad circuits). The dummy pad 140 keeps the ESD bus 142 alive and hence despite the I/O pads running with the battery 112 OFF, any tamper activity will not cause the ESD trigger to turn ON.

In this example, a power management controller 144 monitors supply of power from the external power supply 116 and asserts a low voltage warning signal LVW when a voltage $V_{DD}$ from the external power supply 116 is less than a threshold. The RTC module 110 is powered from the battery in response to assertion of the low voltage warning signal LVW. When the external power supply 116 wakes up, the voltage $V_{DD}$ from the external power supply 116 rises until the low voltage warning signal LVW de-asserts and switches power to be provided from the external power supply 116 instead of the battery 112 when the voltage $V_{DD}$ from the external power supply 116 is greater than the threshold. Assertion of the low voltage warning signal LVW may be latched while the voltage $V_{DD}$ from the external power supply 116 is less than the threshold.

The processor 114 may have a reduced voltage mode of operation in which the low voltage warning signal LVW is disabled, and power is supplied to the RTC module 110 and the tamper detection interface 108 from the battery during the reduced voltage mode of operation. This can be achieved by using low power register settings to make the supply switchover from external power supply 116 to battery source 112. Otherwise, if the voltage of the supply falls while the processor 144 is in low power mode, the power switchover will not happen as the low voltage warning signal LVW is disabled.

In more detail, in the tamper detector 100, ports 146 and 148 provide 180° out-of-phase signals connecting the oscillator 111 of the RTC module 110 with an on-board crystal (not shown) providing a reference frequency. The RTC module I/O segment also includes a ground pad 150 at a voltage $V_{SS}$ common to the battery 112 and external power supply 116.

A power supply switch 152 selects the voltage $V_{BAT}$ from the battery 112 or the voltage $V_{DD}$ from the external power supply 116 and provides the selected voltage $V_{RTC}$ to the RTC module 110, the tamper detection logic 106, the tamper detection interface 108 and a power-on reset (POR) unit 154. The power supply switch 152 selects the voltage $V_{BAT}$ or the voltage $V_{DD}$ depending on the low voltage warning signal LVW. The selected voltage $V_{RTC}$ is equal to $V_{DD}$ if the low voltage warning signal LVW is de-asserted and is equal to $V_{BAT}$ if the low voltage warning signal LVW is asserted. However, in the low power mode of the processor 114, the low voltage warning signal LVW is disabled. Accordingly the power supply switch 152 selects the voltage $V_{BAT}$ when signals VLL/VLP are set in registers that switch the processor 114 to very low leakage or to very low power mode, instead of the low voltage warning signal LVW. The power-on reset unit 154 also provides a signal ISO controlling isolation cells 156 for the tamper detection logic 106 to isolate the signals reaching the RTC logic 106 from the MCU 114 when VDD is unavailable.

FIG. 3 illustrates examples of the operation of the power supplies 112 and 116, the power management controller 144 and the power supply switch 152. FIG. 3 illustrates various examples of operation under simulated conditions, with the external power supply voltage $V_{DD}$ at 0V, low voltage 2V, and full voltage 3.6V and the voltage $V_{BAT}$ at 0V, partly discharged voltage 2V, and fully charged voltage 3.6V. Initially, at 300, the external power supply voltage $V_{DD}$ is zero and the power supply switch 152 selects the voltage $V_{BAT}$ from the battery 112 for the selected voltage $V_{RTC}$. At 302, the external power supply voltage $V_{DD}$ increases to a level where it exceeds the low voltage threshold, the low voltage warning signal LVW de-asserts, and the power supply switch 152 selects the voltage $V_{DD}$ from the external power supply 116 for the selected voltage $V_{RTC}$. The selected voltage $V_{RTC}$ supplies power to the RTC module 110, the tamper detection logic 106, the tamper detection interface 108 and the POR unit 154. The POR unit 154 provides the signal POR to reset the tamper detection logic 106 at the first power-on. Subsequently, as long as either the voltage $V_{DD}$ or the voltage $V_{BAT}$ is present, the POR unit 154 does not re-trigger to reset the tamper detection logic 106, which works continuously as long as one of the two supplies are available, even when the power supply switch 152 switches between the voltages $V_{BAT}$ and $V_{DD}$.

At 304, the operation if the battery voltage $V_{BAT}$ falls to zero is illustrated, simulating the situation where the battery 112 was removed due to tampering. The power supply switch 152 keeps the selected voltage $V_{RTC}$ equal to the external power supply voltage $V_{DD}$, so that the tamper detection logic 106 and the tamper detection interface remain operational and capable of detecting tampering. The battery voltage $V_{BAT}$ is shown recovering subsequently, for the purposes of this illustration.

At 306, the operation when the voltage $V_{DD}$ from the external power supply 116 falls away is illustrated, the selected voltage $V_{RTC}$ initially following the voltage $V_{DD}$ down. At 308, the low voltage warning signal LVW is asserted, until the power management controller 144 loses its power supply voltage $V_{DD}$. The power supply switch 152 latches the low voltage warning signal LVW and the selected voltage $V_{RTC}$ switches to the voltage $V_{BAT}$ from the battery 112. The battery voltage $V_{BAT}$ is shown at a higher level subsequently, verifying that the selected voltage $V_{RTC}$ follows the increase in the voltage $V_{BAT}$.

At 310, the external power supply voltage $V_{DD}$ recovers to a level higher than the low voltage threshold. The low voltage warning signal LVW de-asserts, and the power supply switch 152 selects again the voltage $V_{DD}$ from the external power supply 116 for the selected voltage $V_{RTC}$. The operation then is shown repeating.

The external power supply 116 has a voltage regulator which provides the voltage $V_{DD}$ to the power supply switch 152, and also provides a power supply voltage $V_{MCU}$ to the processor 114 equal to the voltage $V_{DD}$ in full-power mode, while being able to reduce (low power mode) the voltages $V_{DD}$ and the voltage $V_{MCU}$ for power or leakage current saving. The voltage regulator receives the voltage $V_{MAINS}$, continuously from an external source (not shown).

The specific I/O port TMPR0 is connected with the tamper detection logic 106 through two parallel paths. A first path includes the Schmitt trigger 124 and the level shifter 134 in series. In the tamper detection configuration, this first path provides the passive tamper detection signal TMPR0_$D_{IN}$ powered by the battery 112 from the tamper detection elements to the tamper detection logic 106 in the event of tampering, when power from the battery 112 is available.

The second path for the specific I/O port TMPR0 includes the buffer 118, which is active-low in this example. In the wake-up configuration, the specific I/O port TMPR0 is connected to an enable terminal of the external power supply 116 and through a resistor 158 to the source of power $V_{MAINS}$. The buffer 118 has a data input connected to the tamper detection logic 106 to receive the wake-up data input signal WKUP_$D_{OUT}$. The buffer 118 also has an enable input connected to the tamper detection logic 106 to receive a signal WKUP_EN_HiZ. When the signal WKUP_EN_HiZ is asserted, the buffer 118 assumes its high impedance output state. Unless the buffer 118 is in its low impedance output state with the data input WKUP_$D_{OUT}$ pulling the voltage of the specific I/O port TMPR0 down to ground, the resistor 158 pulls up the voltage of the enable terminal to wake up the external power supply 116. The tamper detection logic 106 can be programmed to wake up the external power supply 116 periodically or through a predetermined time count interrupt stored inside the tamper detection logic 106.

The tamper detection ports TMPR1 and TMPR2 are each connected with the tamper detection logic 106 through three parallel paths. First paths include the Schmitt triggers 126, 130 and an input of multiplexers 160, 162. These first paths can receive the active tamper detection signals. Second paths include in series the Schmitt triggers 128, 132, the level shifters 136, 138, and another input of the multiplexers 160, 162. These second paths can receive the passive tamper detection signals. Selection signals TMPR1_EN and TMPR2_EN from the tamper detection logic 106 select the active or passive tamper detection signals from the first or second paths as input TMPR1_$D_{IN}$, TMPR2_$D_{IN}$ to the tamper detection logic from the multiplexers 160, 162. The third paths include the buffers 120 and 122, which are tri-state buffers. Control inputs TMPR1_DIR, TMPR2_DIR from the tamper detection logic 106 select whether the buffers 120 and 122 assume a high-impedance state or a low-impedance state. In the high-impedance state, the tamper detection ports TMPR1 and TMPR2 cannot propagate active tamper signature signals in the tamper detection elements and can only receive tamper detection signals. In the low-impedance state, either of the tamper detection ports TMPR1 and TMPR2 can propagate active tamper signature signals TMPR1_$D_{OUT}$, TMPR2_$D_{OUT}$ in the tamper detection elements.

In an active tamper condition, tamper signature signals can be propagated from either TMPR1 or TMPR2 and get received on the other port TMPR2 or TMPR1. The entire path does not need $V_{BAT}$ and hence if a tampering event happens while $V_{BAT}$ is unavailable, the active tamper signature detection will continue to operate seamlessly.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Similarly, any arrangement of components to achieve the same functionality is effectively "associated" such that the desired functionality is achieved. Hence, any two components combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A tamper detector, comprising:
a processor having a powered operational mode and a power-off mode;
an external power supply for supplying power to the processor in the powered operational mode; and
a real-time clock (RTC) module, including:
a plurality of tamper detection ports for connection to tamper detection elements protecting a module;
tamper detection logic connected to the tamper detection ports by way of a tamper detection interface; and
a specific input/output (I/O) port for connection in a wake-up configuration to a control input of the external power supply;
wherein the RTC module is powered by the external power supply in the powered operational mode and by a battery in the power off mode; and
wherein a wake-up signal on the specific I/O port in the wake-up configuration wakes up the external power supply from the power off mode to supply power.

2. The tamper detector of claim 1, wherein the RTC module provides the wake-up signal in an isolated event and in a periodic timed sequence.

3. The tamper detector of claim 1, further comprising a buffer connecting the tamper detection logic to the specific I/O port, wherein the buffer assumes a high impedance output state to assert the wake-up signal, and a low impedance output state to de-assert the wake-up signal when power from the battery is available.

4. The tamper detector of claim 3, wherein a source of power for the external power supply is connectable to assert the wake-up signal for the external power supply in the high impedance output state of the buffer in the wake-up configuration of the specific I/O port.

5. The tamper detector of claim 4, wherein the buffer drives the specific I/O port to de-assert the wake-up signal.

6. The tamper detector of claim 4, wherein the specific I/O port is connectable between one of the tamper detection elements protecting the module and the tamper detection logic in a tamper detection configuration in which the specific I/O port is disconnected from the source of power for the external power supply, and wherein the tamper detection logic provides a control signal to the buffer causing the buffer to assume the high impedance output state in the tamper detection configuration and enabling a passive tamper detection input path through the specific I/O port.

7. The tamper detector of claim 6, wherein the specific I/O port is connectable in the tamper detection configuration to provide a passive tamper detection signal from the tamper detection element to the tamper detection logic when power from either or both of the internal power supply and the battery is available.

8. The tamper detector of claim 1, wherein the tamper detection logic detects tampering through the tamper detection ports even when the battery is unavailable.

9. The tamper detector of claim 1, wherein the tamper detection interface is configurable to connect at least two ports for the tamper detection logic to propagate an active tamper signature signal in the tamper detection elements and receive a corresponding active tamper detection signal.

10. The tamper detector of claim 9, wherein the tamper detection logic controls the direction of propagation of the signature signal and reception of the active tamper detection signal through the at least two ports.

11. The tamper detector of claim 9, wherein the tamper detection interface is configurable alternatively to connect the at least two ports to provide a passive tamper detection signal from the tamper detection elements in the protected module through the tamper detection ports to the tamper detection logic.

12. The tamper detector of claim 1, wherein the tamper detection interface includes triggers through which the tamper detection ports connect to the tamper detection logic, the triggers having a predetermined output signal level as a function of a variable input signal level.

13. The tamper detector of claim 1, wherein the tamper detection interface includes level shifters through which the tamper detection ports connect to the tamper detection logic when the tamper detection ports are powered by the battery.

14. The tamper detector of claim 1, further comprising a dummy pad connected to receive power from the external power supply and to power an electrostatic discharge (ESD) bus connected to the tamper detection ports and the specific I/O port, when power from the battery is unavailable.

15. The tamper detector of claim 1, further comprising:
a power management controller for monitoring supply of power from the external power supply and asserting a low voltage warning signal when a voltage from the external power supply is less than a threshold,
wherein the RTC module is powered from the battery in response to assertion of the low voltage warning signal, and wherein power is supplied from the external power supply instead of the battery in response to de-assertion of the low voltage warning signal when the voltage from the external power supply is greater than the threshold.

16. The tamper detector of claim 15, wherein assertion of the low voltage warning signal is latched while the voltage from the external power supply is less than the threshold.

17. The tamper detector of claim 15, wherein the processor has a reduced voltage mode of operation in which the low voltage warning signal is disabled, and power is supplied to the RTC module and the tamper detection interface from the battery during the reduced voltage mode of operation.

* * * * *